Patented Oct. 10, 1944

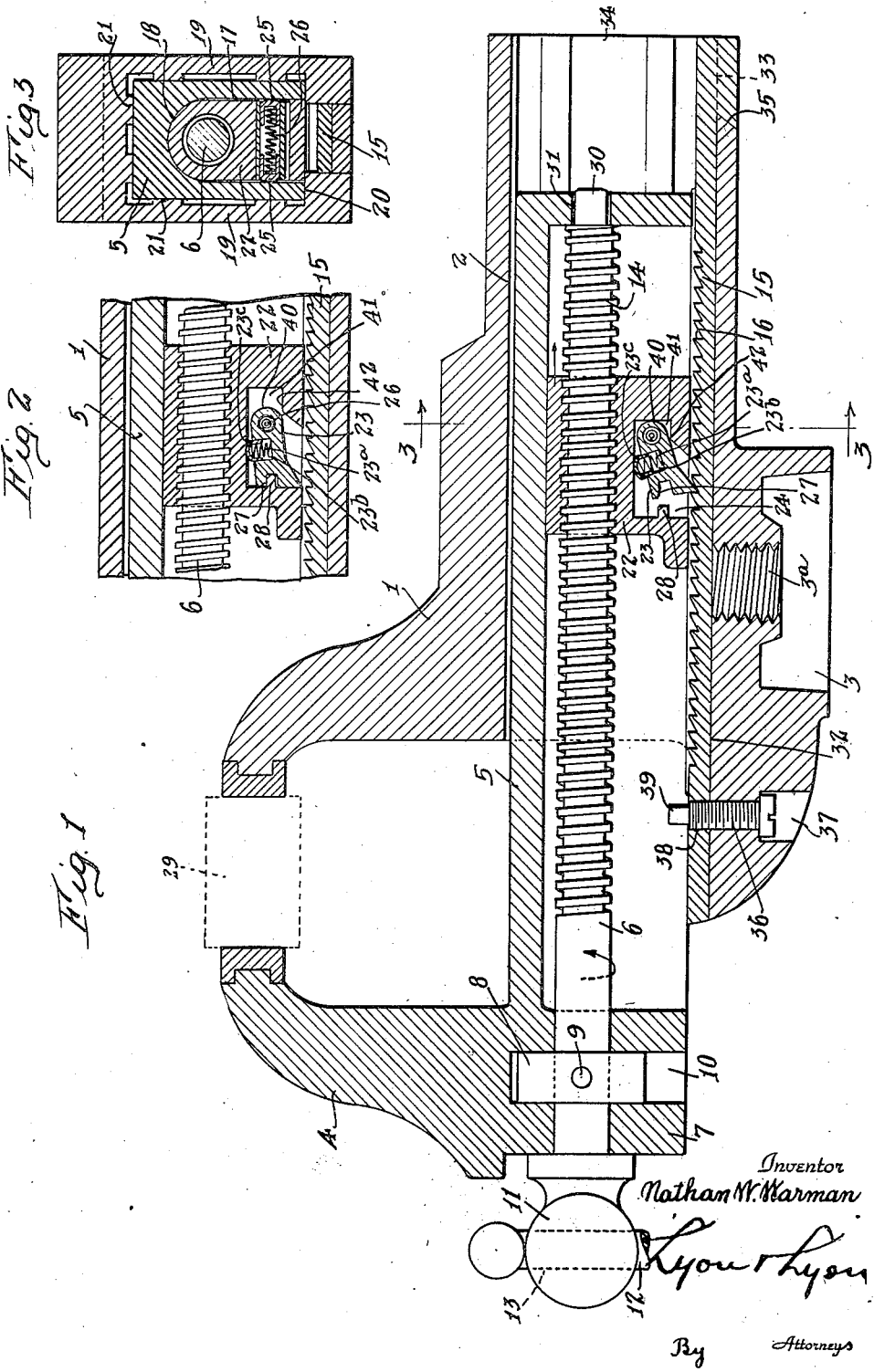

2,359,951

UNITED STATES PATENT OFFICE 2,359,951

QUICK-ACTION VISE

Nathan W. Warman, Los Angeles, Calif.

Application September 5, 1942, Serial No. 457,409

9 Claims. (Cl. 81—30)

This invention relates to vises of the type commonly known as bench vises. These vises are used very extensively in all machine shops and other places where it is necessary to hold a piece of work fixed to perform any hand operation upon it. Such vises usually involve the use of a relatively fixed jaw that is secured to the bench, and a relatively movable jaw that is guided on the fixed jaw or other fixed part so that it is capable of movement away from the fixed jaw to receive the work, and so that it can be quickly moved up to clamp the work between the jaws. The construction of such vises usually involves the use of a long clamping screw that is swiveled in the movable jaw, and which is threaded into a fixed lug or "nut" located toward the back of the vise so that as the clamping screw is rotated on its axis it will move the movable jaw in and out through the extent of its travel. However, the traveling movement of the movable jaw in this way is very slow and entails a considerable waste of time if it is desired to adapt the vise quickly from one jaw gap or jaw opening to another amount of jaw opening. For example, if it is necessary to use the vise for clamping a succession of pieces of work of different sizes, there would be a considerable loss of time in opening up the jaws to take a large piece of work after having been using the vise to clamp small work.

One of the objects of this invention is to produce a quick-action vise, that is to say, a vise in which the movable jaw can be quickly run in and out to adapt the vise to any desired dimension of gap between the jaws, and without depending upon the laborious rotation of the clamping screw through many revolutions to accomplish this necessary movement.

Heretofore vises of this type have been constructed so as to include a nut on the clamping screw cooperating with a rack that extends longitudinally with the direction of travel of the shank of the movable jaw, and such vises operate in such a way that it was possible to set the nut in different positions on the rack, thereby enabling the movable jaw to have a quick movement to a desired position without depending entirely upon the rotation of the clamping screw. The connections of the nut to the rack are usually effected by means of a pawl or equivalent element. My prior Patent No. 2,094,198, granted to me September 28, 1937, is an example of a vise of this type, but in order to release the pawl it was necessary to rotate the clamping screw in a reverse direction to move the nut back to its extreme position in the back of the shank of the movable jaw, thereby effecting its release from the rack. In the vise disclosed in my prior patent, the thread on the clamping screw was comparatively short, and this occasioned increased wear due to the fact that the nut was constantly traveling at substantially the same point on the thread. One of the objects of the present invention is to provide a vise of this kind in which the clamping screw has a relatively long threaded portion along which the nut can travel, and constructed in such a way that engaging means between the nut and the rack, may be controlled so as to release it regardless of what position the nut has on the length of the thread.

A further object of the invention is to construct a vise of this type in such a way that by a slight amount of reverse rotation of the clamping screw in any relative position of the movable jaw and fixed jaw, the nut can be released from the rack so as to permit free movement of the movable jaw toward or from the fixed jaw.

In vises of this type, the rack is usually constructed as a separate part and attached to the wall of the guide that is formed in the fixed jaw, for guiding the shank of the movable jaw; and one of the objects of my present invention is to provide a simple construction for seating the rack in the fixed jaw, which will simplify the operation of machining the seat, but which will insure the effective resistance of the forces developed in the rack when the movable jaw is clamped up on the work in the vise.

In its preferred embodiment, the present invention involves the use of detent means associated with the nut and capable of engaging the rack to hold the nut relatively fixed when the movable jaw is clamped up; and one of the objects of my invention is to provide simple means for mounting the detent to travel with the nut while at the same time, permitting lost motion between the detent and the nut, utilizing this lost motion to enable the nut and detent to cooperate when desired, to release the detent from the rack.

Further objects of the invention will appear hereinafter.

The invention consists in the novel parts and combination of parts to be described hereinafter, all of which contribute to produce an efficient quick-action vise.

A preferred embodiment of the invention is described in the following specification, while the broad scope of the invention is pointed out in the appended claims.

In the drawing:

Fig. 1 is a longitudinal vertical section taken through a bench vise embodying my invention, a portion of the handle bar at the forward end of the clamping screw, being broken away. This view shows the parts in a relation they could have when the work indicated in dotted outline, has been clamped up in the vise.

Fig. 2 is a fragmentary vertical section taken in the same plane as the section in Fig. 1, and showing the nut and detent, and a portion of the rack. This view illustrates the parts and the relation they have when the detent has been withdrawn from the rack to permit free movement of the movable jaw in or out by hand, and independently of any rotation of the clamping screw.

Fig. 3 is a vertical transverse section taken on the line 3—3 of Fig. 1, and particularly illustrating details of the detent and means for mounting the same in association with the nut.

In the vise illustrated, I indicates the relatively fixed jaw of the vise, the rear portion of which is preferably formed into a horizontal guide or guideway 2, the lower portion of the vise being provided with a boss 3 and tapped opening 3a for securing the fixed jaw of the vise to a bench or other support. The vise includes a relatively movable jaw 4 which is formed with a shank 5 that may slide freely in the guide 2. In the present instance the movable jaw carries a clamping screw 6 which is swiveled in the base 7 of the movable jaw 4. This swiveling effect may be accomplished by providing a collar 8 secured to the screw by means of a cotter pin 9, the collar being carried in a slot 10 cut into the base 7 from below. The outer end of the screw 6 has the usual ball head 11 with a movable handle bar 12 mounted in a diametrical slot 13 in the head 11.

In practicing the invention I provide a nut mounted to travel on the thread 14 of the screw, and associated with this nut I provide detent means to cooperate with a rack that extends longitudinally with the shank 5. This detent means is preferably in the form of a pawl that cooperates with the rack and which is mounted for limited lost motion in or on the nut in the direction in which the nut travels. Associated with the detent I provide means for yieldingly resisting movement of the detent by the nut. In addition to this, the nut and the detent are provided with cooperating correlated means constructed so that a slight movement of the nut occasioned by the reverse rotation of the screw will cause the nut to disengage the detent from the rack, after which the movable jaw can be moved freely in or out, that is to say, toward or from the relatively fixed jaw without the necessity for rotating the clamping screw. In order to accomplish this, in one of the walls of the guide 2, preferably the bottom wall, I mount a rack 15 which presents equidistant teeth that incline toward the rear so that they present abrupt substantially vertical faces 16 capable of cooperating with the pawl or detent to prevent the same from being moved forwardly or toward the movable jaw 4. This rack is shown in section in Fig. 3, and that view also illustrates the preferred cross-section for the shank 5. This shank is of substantially rectangular cross-section with a deep inverted U-shaped channel 17 formed in the same from the under side, where the rack 15 is located. The upper face 18 of this channel is preferably a cylindrical surface formed around the axis of the clamping screw as a center or axis. Near the lower portion of each side wall 19 of the guide 2, a guide face, or ledge 20, is provided. These ledges support the shank 5 for sliding movement in or out in the guide 2. For convenience in machining the interior of the guideway 2, its inner face is formed with a plurality of raised faces or bosses 21 which are machined or finished as guides for the side walls and upper face of the shank 5. The shank may be finished all over, or provided with similar raised faces or bosses to match with the bosses 21.

The U-shaped channel 17 operates as a guide for the nut 22 which is carried on the thread 14. The bottom face of the nut is supported toward each side on the ledges 20, and each ledge is slightly elevated above the peaks of the teeth of the rack 16 so as to insure that the nut will always slide freely over the rack unless its forward sliding movement is prevented by a detent pawl 23. This detent, or detent pawl 23, is preferably mounted in a pawl socket 24 that extends completely through the nut from side to side. This is to enable a pivot to be provided for the pawl, which can have frictional contact with the side faces of the channel 17 (see Fig. 3). This pawl 23 is somewhat shorter in length than the length of the pawl socket measured in the direction of travel of the nut. In other words, the pawl is a floating detent mounted in the pawl socket for lost motion, and this lost motion is utilized to enable the nut when moved in a rearward direction, to lift the pawl out of engagement with the teeth of the rack 16. In doing this the movable jaw is held fixed.

It should be understood that the side faces of the pawl are not in contact with the sides of the U-shaped guideway 17, and hence the pawl can swing freely about its pivot, and this pivot preferably consists of two separated pin heads 25, the inner sides of which are drilled out to form sockets for a coil spring 26. This spring exerts its force to hold the pin heads 25 in frictional contact with the U-shaped guide for the nut.

The free end of the detent 23 and the adjacent end of the pawl socket 24, are provided the one with a cam and the other with means to cooperate with the cam to raise the pawl when the nut is moved toward the rear end of the shank. For this purpose I prefer to form the end of the pawl with a cam face 27 to cooperate with a tongue 28 that projects from the forward wall of the nut toward the cam. When the nut moves toward the rear as described, the tongue 28 will engage the cam 27 and raise the pawl to the position illustrated in Fig. 2. When this occurs, of course, the movable jaw 4 can be moved freely back and forth in the guideway 2.

In Fig. 1 I illustrate the jaws 1 and 4 as clamped up on work indicated by the dotted outline 29. When the clamping screw is rotated in the right-hand direction to clamp the jaw 4 up against the work, the detent 23 will prevent the nut from coming forward, and hence all the advancing movement of the clamping screw in the nut will be imparted through the swivel collar 8 to the movable jaw 4, and force it up against the work. As soon as it is desired to release the work 29, it is merely necessary to rotate the clamping screw 6 through a small angle in a reverse direction. This will cause the nut 22 to travel toward the rear as indicated by the arrow shown at the rear end of the nut. The pawl 23, however, will not move with the nut in this movement, but will be held by the friction heads or caps 25 against movement. As the tongue 28 engages the cam 27, the pawl will be disengaged from the rack. The movable jaw 4 can then be pulled out a small amount to give clearance for the removal of the work. If the next piece of work to be operated upon is of the same width as the work 29, then it will be put in place between the jaws, whereupon a slight rotation of the clamping screw 6 in a forward direction, that is, a right-hand rotation, will cause the tongue 28 to disengage itself from the cam 27, thereby permitting the pawl to fall down again onto the rack. If it is not desired to rely upon gravity to move the pawl 23 into engagement with the rack, a spring 23a can be employed located in the pawl socket 24 above the pawl, to urge it downwardly. This spring can be carried in a spring chamber 23b in the upper face of the pawl, and with the upper end carried in a tubular spring case 23c having a rounded nose at its upper end thrusting against the upper wall of the pawl socket 24. Such a spring is obviously not necessary in a construction such as that illustrated, in which the rack is located below the pawl, but such a spring should be used if this vise illustrated, were used in a position in which it would lie on its side; or, if it were more convenient in the design of the vise to have the rack located on the side wall of the guide 2 instead of on the bottom wall.

I prefer to have the upper face of the nut 22 guided along the curved face 18 of its guideway, without clearance, because the inclined upward thrust force developed in the pawl when the vise is tightened up, then does not put any lateral strain on the clamping screw 6. However, in order to take care of the possibility that wear on the upper face of the nut would take place in practice after long usage, I prefer to provide the inner end of the clamping screw with a tip 30 of reduced diameter, that is received in a guide socket or bearing that is substantially circular in form, but relieved slightly at its upper side to present a slight clearance 31 which would permit the end pintle 30 to have slight upward movement if an upward lateral strain on the screw should tend to occasion such movement.

In order to facilitate the mounting of the rack 15 in the face of the wall of the guide 2, I prefer to cut a groove or seat 32 in this wall, extending throughout the entire length of the guideway. This groove is like an ordinary key seat, and the rack fits into it from the rear. At the rear end of the guide 2 a slot 33 is cut inwardly from the end face 34, and at the forward end of this slot I form a shoulder 35 which, if desired, may be inclined as shown. This shoulder 35 operates as a seat for a corresponding inclined shoulder formed at this point on the under side of the rack. With this mounting for the rack, it will be evident that the force exerted by the pawl on the rack when the vise is clamped up, is resisted at the shoulder 35. It is therefore unnecessary to employ any connecting bolts which would have to resist this force by their shearing resistance. However, I may provide a stop pin 36 that is in the form of a screw that is screwed up into a socket 37 located below and forwardly of the base portion of the fixed jaw 1. The upper portion of this screw 36 passes through a clearance opening 38 in the rack, and the tip 39 of this screw projects into the path of the nut so as to operate as a stop for it.

It will be evident that in using this vice, the nut 22 may be located at any point on the long thread of the clamping screw and, furthermore, the nut can always be released from the rack by the reverse rotation of the clamping screw as indicated by the arrow on it in Fig. 1, regardless of where the nut is located on the thread of the screw.

This quick-action release of this vise is particularly useful where a vise may be used to clamp successively, pieces of work of different width, because by the slight reverse rotation of the clamping screw, the movable jaw can be quickly freed and then moved outwardly to make a gap between the jaws of the vise sufficient to receive the work. After the work is put in place, a slight rotation of the clamping screw in the right-hand direction or forward direction, will drop the latch and effect the connection of the nut to the rack, after which the movable jaw will begin to tighten up on the work.

The butt end 40 of the pawl or detent 23, is preferably rounded as shown, and in the locking position of the pawl, is received in a rudimentary pocket 41 for it, which is formed in the adjacent end of the pawl socket 24. In this way a shoulder 42 is formed that will prevent the pawl from ever dropping down at its butt end. In Fig. 2 the butt end of the pawl is shown above this shoulder 42 as though this end of the pawl were unsupported. However, the pawl can assume this position because it is supported at its pivot end by the friction pins or caps 25.

Many other embodiments of the invention may be resorted to without departing from the spirit of the invention.

What I claim is:

1. In a quick-action vice, the combination of a relatively fixed jaw, a relatively movable jaw having a shank guided so as to enable the movable jaw to move toward and from the fixed jaw, a clamping screw carried by the movable jaw and extending longitudinally in its shank, a nut guided to slide in the shank and carried on the threads of the clamping screw, a relatively fixed rack extending longitudinally with the said shank, a detent pawl cooperating with the rack and mounted on the nut for limited lost motion in the direction in which the nut travels along the screw, a pivot for the detent pawl and about which the pawl may move to or from the rack, means for developing frictional engagement between the said pivot and said shank, said pawl and said nut having correlated means enabling the rotation of the screw in a reverse direction while the movable jaw is held fixed by hand, to move the detent pawl out of engagement with the rack so as to permit free sliding movement thereafter of the movable jaw and shank in either direction.

2. In a quick-action vise, the combination of a relatively fixed jaw, a relatively movable jaw having a shank guided so as to enable the movable jaw to move toward and from the fixed jaw, a clamping screw carried by the movable jaw and extending longitudinally in its shank, a nut guided to slide in the shank and carried on the threads of the clamping screw, said nut having a pawl socket, a relatively fixed rack extending longitudinally with the shank, a detent pawl carried in the pawl socket so as to travel with the nut and cooperating with the rack, said pawl socket permitting limited lost motion of the pawl relative to the nut in the direction in which the nut travels along the screw, a pivot for the detent pawl and about which the pawl may move toward or from the rack, means for developing a frictional resistance to the movement of the said pivot with the nut, said pawl and said nut having correlated means enabling the rotation of the screw in a reverse direction while the movable jaw is held against outward movement, to move the detent pawl out of engagement with the rack so as to permit free sliding movement thereafter of the movable jaw and shank in either direction.

3. In a quick-action vise, the combination of a relatively fixed jaw, a relatively movable jaw having a shank guided so as to enable the movable jaw to move toward and from the fixed jaw, a clamping screw carried by the movable jaw and extending longitudinally in its shank, a nut guided to slide in the shank and carried on the threads of the clamping screw, said nut having a pawl socket, a relatively fixed rack extending longitudinally with the shank, a detent pawl carried in the pawl socket so as to travel with the nut and cooperating with the rack, said pawl socket permitting limited lost motion of the pawl relative to the nut in the direction in which the nut travels along the screw, a pivot for the detent pawl and about which the pawl may move toward or from the rack, means for developing a frictional resistance to the movement of the said pivot with the nut, said nut and said pawl having the one a tongue and the other a cam face to cooperate with the tongue when the screw is rotated in a reverse direction while the movable jaw is held against outward movement, to withdraw the detent pawl from engagement with the rack and thereby to permit free sliding movement thereafter of the movable jaw in either direction.

4. In mechanism of the kind described, the combination of a rack, a clamping screw extending longitudinally with the rack, a nut traveling on the thread of the screw, a detent pawl capable of engaging the rack, mounted to travel with the nut and capable of limited lost motion with respect to the nut in the direction of travel, a pivot pin for the pawl on which the pawl can swing into or out of engagement with the rack, means for subjecting the ends of the pivot pin to frictional contact to resist yieldingly the movement of the pawl by the nut, said pawl and said nut having correlated means for enabling movement of the nut relative to the pawl in one direction to disengage the pawl from the rack.

5. In mechanism of the kind described, the combination of a rack, a shank guided to slide longitudinally of the rack and having a channel therein, a clamping screw extending longitudinally in the channel, a nut traveling on the thread of the screw and guided by the side walls of the channel, a detent pawl capable of engaging the rack, mounted to travel with the nut and capable of limited lost motion with respect to the nut in the direcion of travel, a pivot pin for the pawl having means for pressing its ends against the side walls of the channel to develop a yielding resistance to movement of the pawl by the nut, said pawl and said nut having correlated means for enabling movement of the nut relative to the pawl in one direction to disengage the pawl from the rack.

6. In a vise, the combination of a relatively fixed jaw, a relatively movable jaw guided to move toward or from the fixed jaw, and having a longitudinally extending contact face, a nut for cooperation with said jaws, a detent having a pivot in frictional contact with said contact face, said pivot mounted for limited lost motion relative to the nut in the direction of its travel, a clamping screw swiveled in the movable jaw and threaded in the nut for clamping up the movable jaw on work held between the jaws, said nut and said detent having coordinated means operating through the agency of said frictional contact to enable the nut to move the detent to its release position, and thereby enabling the movable jaw to be set for free outward movement to receive the work between the jaws; said nut and detent having correlated engaging faces operating when the screw is rotated in a forward direction thereafter to activate the detent to hold the nut against forward movement so as to enable the movable jaw to be clamped up against the work.

7. A vise constructed as described in claim 6, having resilient means for urging the pawl toward the rack for engagement therewith.

8. A vise in accordance with claim 6, in which the nut and the detent are provided with cooperating means including a cam for effecting the said release of the detent when setting the relatively movable jaw for free outward movement.

9. A vise in accordance with claim 6, in which the movable jaw is provided with a bearing for the inner end of the screw, said bearing constructed to permit limited lateral movement of the end of the screw at said bearing.

NATHAN W. WARMAN.